United States Patent [19]

Adam et al.

[11] Patent Number: 5,599,354
[45] Date of Patent: Feb. 4, 1997

[54] AZO DYE MIXTURES AND THEIR USE

[75] Inventors: Jean-Marie Adam, Rosenau, France; Peter Sutter, Muttenz, Switzerland; Francine Casi, Eschnetzwiller, France

[73] Assignee: Ciba-Geigy Corporation, Tarrytown, N.Y.

[21] Appl. No.: 595,439

[22] Filed: Feb. 5, 1996

[30] Foreign Application Priority Data

Feb. 10, 1995 [CH] Switzerland .................... 0407/95

[51] Int. Cl.$^6$ ................. D06P 3/16; D06P 1/06; D06P 1/40
[52] U.S. Cl. ............. 8/641; 8/643; 8/533; 8/917
[58] Field of Search ............. 8/638–643, 917, 8/924, 533

[56] References Cited

U.S. PATENT DOCUMENTS

| | | | |
|---|---|---|---|
| 4,445,905 | 5/1984 | Schaetzer et al. | 8/641 |
| 4,652,269 | 3/1987 | Bowles | 8/641 |
| 5,131,919 | 7/1992 | Mausezahl | 8/643 |
| 5,356,445 | 10/1994 | De Meulemeester | 8/641 |

FOREIGN PATENT DOCUMENTS

| | | |
|---|---|---|
| 593392 | 4/1994 | European Pat. Off. . |
| 49639 | 5/1993 | France . |
| 1644121 | 4/1971 | Germany . |

*Primary Examiner*—Margaret Einsmann
*Attorney, Agent, or Firm*—Kevin T. Mansfield

[57] ABSTRACT

The invention relates to dye mixtures consisting of (a) 0–100% by weight of at least one dye mixture comprising a compound of the formula

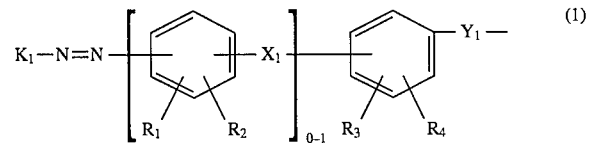

(1)

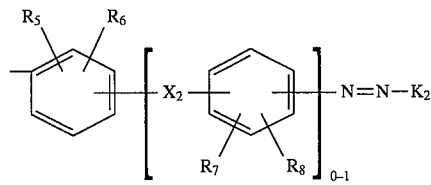

and a compound of the formula

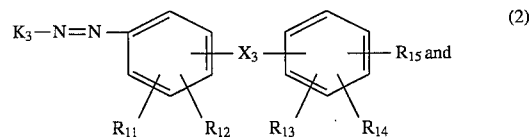

(2)

(b) 0–100% by weight of at least one dye mixture comprising a compound of the formula

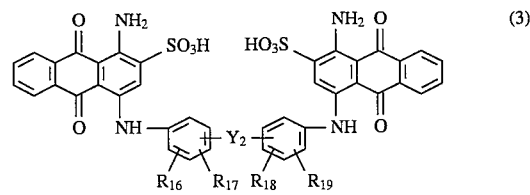

(3)

and a compound of the formula

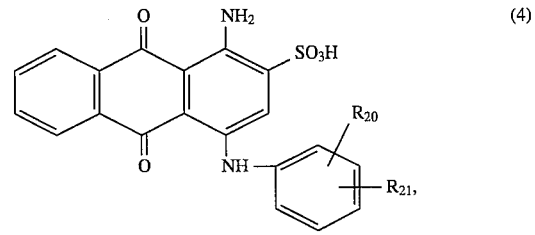

(4)

in which the variables are as defined in the claims and the sum of (a) and (b) is 100% by weight. The dye mixtures according to the invention are suitable for dyeing or printing hydroxyl-containing or nitrogen-containing fibre materials and give dyeings or prints having good all-round fastness properties.

12 Claims, No Drawings

AZO DYE MIXTURES AND THEIR USE

The present invention relates to mixtures of azo dyes which are suitable in particular for dyeing or printing natural or synthetic polyamide fibre materials, giving dyeings or prints having good all-round fastness properties.

The present invention consequently relates to dye mixtures consisting of (a) 0–100% by weight of at least one dye mixture comprising
a compound of the formula

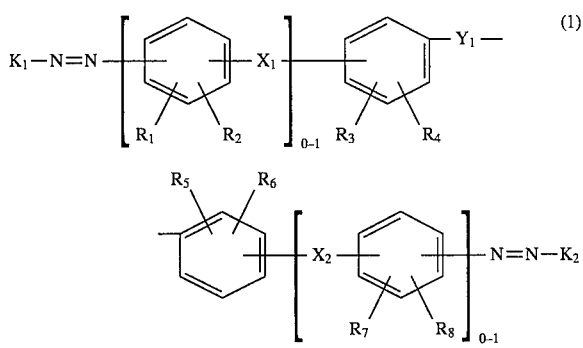

in which $K_1$ and $K_2$ independently of one another are each the radical of a coupling component of the benzene or naphthalene series or of the heterocyclic series, $X_1$ and $X_2$ are each independently of the another a bridging member of the formula $-SO_2-O-$, $-SO_2-N(R_9)-$, $-COO-$ or $-CO-N(R_{10})-$ in which $R_9$ and $R_{10}$ independently of one another are each hydrogen or $C_1-C_4$alkyl, $R_1$, $R_2$, $R_3$, $R_4$, $R_5$, $R_6$, $R_7$ and $R_8$, independently of one another are each hydrogen, $C_1-C_6$alkyl, $C_1-C_4$alkoxy, halogen, sulfo, unsubstituted or halogen-substituted $C_2-C_4$alkanoylamino or an unsubstituted or halogen-substituted group $-NHCO-C_2-C_4$alkylene and $Y_1$ is a direct bond, straight-chain or branched $C_1-C_6$alkylene or $C_5-C_8$cycloalkylene, and a compound of the formula

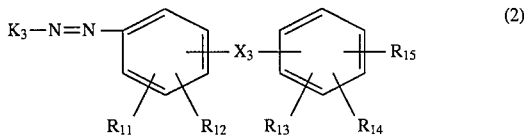

in which $K_3$ independently is as defined above for $K_1$; $X_3$ independently is as defined above for $X_1$; $R_{11}$, $R_{12}$, $R_{13}$ and $R_{14}$ independently of one another are each as defined above for $R_1$, and $R_{15}$ is $C_1-C_2$alkyl, $C_5-C_8$cycloalkyl or halogen, and (b) 0–100% by weight of at least one dye mixture comprising
a compound of the formula

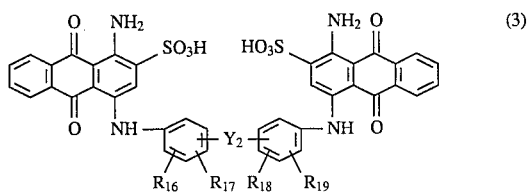

in which $R_{16}$, $R_{17}$, $R_{18}$ and $R_{19}$ independently of one another are each hydrogen, $C_1-C_6$alkyl, $C_1-C_4$alkoxy, halogen, unsubstituted or halogen-substituted $C_2-C_4$alkanoylamino or an unsubstituted or halogen-substituted group $NHCO-C_2-C_4$alkylene and $Y_2$ is a direct bond, straight-chain or branched $C_1-C_6$alkylene or $C_5-C_8$cycloalkylene, and a compound of the formula

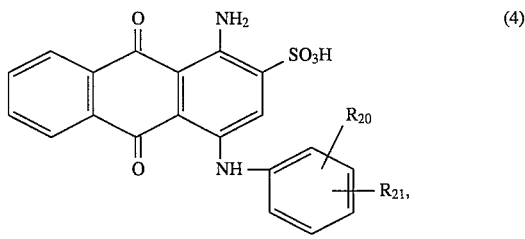

in which $R_{20}$ is as defined above for $R_{16}$, and $R_{21}$ is $C_1-C_{12}$alkyl, $C_5-C_8$cycloalkyl, $C_2-C_4$alkanoylamino or benzoylamino,
with the proviso that the sum of (a) and (b) is 100% by weight.

The coupling components $K_1$-H, $K_2$-H and $K_3$-H on which the compounds of the formulae (1) and (2) are based are known per se and are described in large numbers, for example in Venkataraman "The Chemistry of Synthetic Dyes" Volume 6, pages 213–297, Academic Press, New York, London 1972.

$K_1$, $K_2$ and $K_3$ independently of one another are each preferably the radical of a benzene, naphthalene, pyrazolone, aminopyrazole, pyridone, pyrimidine, indole, naphthylimidazole, diphenylamine, pyrazolo[2,3-a]pyrimidine, tetrahydroquinoline or acetoacetamide coupling component, which radicals can be substituted further.

Examples of suitable substituents on the radical $K_1$, $K_2$ or $K_3$ are: $C_1-C_6$alkyl, which refers generally to methyl, ethyl, n- or isopropyl, n-, iso-, sec- or tert-butyl or straight-chain or branched pentyl or hexyl; $C_1-C_4$alkoxy, which refers generally to methoxy, ethoxy, n- or isopropoxy or n-, iso-, sec- or tert-butoxy; hydroxy-$C_1-C_4$alkoxy, phenoxy; unsubstituted or hydroxy-substituted $C_2-C_6$alkanoylamino, for example acetylamino, hydroxyacetylamino or propionylamino; benzoylamino; amino; N—$C_1-C_4$alkylamino or N,N-di-$C_1-C_4$alkylamino each of which is unsubstituted or substituted in the alkyl moiety by, for example, hydroxyl, $C_1-C_4$alkoxy, carboxyl, cyano, halogen, sulfo, sulfato, phenyl or sulfophenyl, examples being methylamino, ethylamino, N,N-dimethylamino, N,N-diethylamino, β-cyanoethylamino, β-hydroxyethylamino, N,N-di-β-hydroxyethylamino, β-sulfoethylamino, γ-sulfo-n-propylamino, β-sulfoethylamino, N-ethyl-N-(3-sulfobenzyl)amino, N-(β-sulfoethyl)-N-benzylamino; cyclohexylamino; N-phenylamino or N-$C_1-C_4$alkyl-N-phenylamino each of which is unsubstituted or substituted in the phenyl moiety by $C_1-C_4$alkyl, C-$C_4$alkoxy, halogen or sulfo; $C_2-C_4$alkoxycarbonyl, for example methoxy- or ethoxycarbonyl; trifluoromethyl; nitro; cyano; halogen, which refers generally, for example, to fluorine, bromine or, in particular, chlorine; ureido; hydroxyl; carboxyl; sulfo; sulfomethyl; carbamoyl; sulfamoyl; N-phenylsulfamoyl or N—$C_1-C_4$alkyl-N-phenylsulfamoyl each of which is unsubstituted or substituted in the phenyl moiety by sulfo or carboxyl; methyl- or ethylsulfonyl; or phenylazo or naphthylazo each of which is unsubstituted or substituted, for example by $C_1-C_4$alkyl, $C_1-C_4$alkoxy, halogen, sulfo, amino, N—$C_1-C_4$alkylamino, N,N—di—$C_1-C_4$alkylamino or phenylamino.

Preferred definitions of $K_1$, $K_2$ and $K_3$, independently of one another, are: a phenyl or naphthyl radical which carries one or more substituents from the group consisting of sulfo, hydroxyl, $C_1$–$C_4$alkoxy, hydroxy-$C_1$–$C_4$alkoxy, amino, unsubstituted or hydroxyl-, sulfato- or phenyl-substituted N—$C_1$–$C_4$alkylamino or N,N-di-$C_1$–$C_4$alkylamino, acetylamino, benzoylamino, $C_1$–$C_4$alkyl, and phenylazo or naphthylazo each of which is unsubstituted or substituted by $C_1$–$C_4$alkyl, $C_1$–$C_4$alkoxy, halogen, sulfo, amino, N—$C_1$–$C_4$alkylamino, N,N-di-$C_1$–$C_4$alkylamino or phenylamino; an unsubstituted or $C_1$–$C_4$alkyl-, $C_1$–$C_4$alkoxy, sulfo- or halogen-substituted 1-phenylpyrazol-5-one or 1-phenyl-5-aminopyrazole radical; an unsubstituted or $C_1$–$C_4$alkyl-, $C_1$–$C_4$alkoxy-, sulfo- or halogen-substituted indole radical; and a naphthylimidazole radical which is unsubstituted or is substituted by $C_1$–$C_6$alkyl, sulfo, hydroxyl or phenylamino which can in turn be substituted by $C_1$–$C_4$alkyl, $C_1$–$C_4$alkoxy, sulfo or halogen.

$K_1$, $K_2$ and $K_3$, independently of one another, are each particularly preferably a phenyl radical which carries one or more substituents from the group consisting of amino, unsubstituted or hydroxyl- or sulfato-substituted N-mono- or N,N-di-$C_1$–$C_2$alkylamino, benzylamino, hydroxyl and methoxy, a 1- or 2-naphthyl radical which carries one or more substituents from the group consisting of hydroxyl, amino, acetylamino, sulfo and chlorine, or a 1-phenylpyrazol-5-One or 1-phenyl-5-aminopyrazole radical each of which carries one or more substituents from the group consisting of methyl, methoxy, sulfo and chlorine.

One or more unsubstituted or halogen-substituted $C_2C_4$alkanoylamino radicals $R_1$–$R_8$, $R_{11}$–$R_{14}$ and $R_{16}$–$R_{20}$ are each, for example, acetylamino, propionylamino or chloroacetylamino.

One or more unsubstituted or halogen-substituted —NHCO—$C_2$–$C_4$alkylene group radicals $R_1$–$R_8$, $R_{11}$–$R_{14}$ and $R_{16}$–$R_{20}$ are each, for example, a radical —CH=$CH_2$ or a radical —CZ=$CH_2$ in which Z is halogen, for example chlorine or bromine, and preferably a radical —CBr=$CH_2$.

The radicals, $R_1$–$R_8$, $R_{11}$, $R_{12}$ and $R_{16}$–$R_{19}$ independently of one another are each preferably hydrogen, methyl, ethyl, methoxy, ethoxy, chlorine or sulfo and particularly preferably hydrogen, methyl, methoxy, chlorine or sulfo. A preferred embodiment of the invention relates to compounds of the formula (1) in which $R_1$, $R_3$, $R_5$, $R_7$, $R_{11}$, $R_{16}$ and $R_{18}$ are each hydrogen and $R_2$, $R_4$, $R_6$, $R_8$, $R_{12}$, $R_{17}$ and $R_{19}$ independently of one another are each hydrogen, methyl, methoxy, chlorine or sulfo. A particularly preferred embodiment of the invention relates to compounds of the formula (1) in which $R_1$–$R_8$, $R_{11}$, $R_{12}$ and $R_{16}$–$R_{19}$ are each hydrogen.

The radicals $R_{13}$, $R_{14}$ and $R_{20}$ independently of one another are each preferably hydrogen, $C_1$–$C_6$alkyl, methoxy, ethoxy, chlorine or sulfo, and particularly preferably hydrogen or $C_1$–$C_4$alkyl.

A $C_1$–$C_2$alkyl radical $R_{15}$ or $R_{21}$ is, for example, methyl, ethyl, n- or isopropyl, n-, iso-, sec- or tert-butyl or straight-chain or branched pentyl, hexyl, heptyl, octyl, nonyl, decyl, undecyl or dodecyl. $R_{15}$ and $R_{16}$ independently of one another are each preferably a $C_1$–$C_{10}$alkyl radical and particularly preferably a $C_4$–$C_8$alkyl radical.

A $C_5$–$C_8$cycloalkyl radical $R_{15}$ or $R_{21}$ is, for example, cyclohexyl which is unsubstituted or substituted by 1 to 3 methyl groups, and is preferably cyclohexyl.

The bridging members $X_1$, $X_2$ and $X_3$ mentioned under formulae (1) and (2) should be interpreted such that their S or C atom, respectively, is attached in each case to the left-hand phenyl radical and the O or N atom, respectively, is attached to the right-hand phenyl radical. $X_1$, $X_2$ and $X_3$ independently of one another are each preferably a bridging member of the formula —$SO_2$—O—, —$SO_2$—N($C_1$–$C_4$alkyl)—, —COO— or —CO—N($C_1$–$C_4$alkyl)— and particularly preferably are each the group —$SO_2$—O—.

A straight-chain or branched $C_1$–$C_6$alkylene group $Y_1$ or $Y_2$ can be, for example, methylene, 1,1- or 1,2-ethylene, 1,1-dimethylmethylene, 1,2- or 1,3-propylene or straight-chain or branched butylene, pentylene or hexylene.

$C_5$–$C_8$alkylene $Y_1$ or $Y_2$ can, for example, be cyclohexylene which is unsubstituted or is substituted by 1 to 3 methyl groups, and can preferably be cyclohexylene.

$Y_1$ and $Y_2$ are preferably a direct bond, a straight-chain or branched $C_1$–$C_4$alkylene radical or cyclohexylene.

A preferred group of dyes of the formula (1) used in accordance with the invention are those in which $K_1$ and $K_2$ independently of one another are each a phenyl radical which carries one or more substituents from the group consisting of amino, unsubstituted or hydroxyl- or sulfato-substituted N-mono- or N,N-di-$C_1$–$C_2$alkylamino, benzylamino, hydroxyl and methoxy, or are a 1- or 2-naphthyl radical which carries one or more substituents from the group consisting of hydroxyl, amino, acetylamino, sulfo and chlorine, or are a 1-phenyl-pyrazol-5-one or 1-phenyl-5-aminopyrazole radical which in each case carries one or more substituents from the group consisting of methyl, methoxy, sulfo and chlorine, $R_1$, $R_3$, $R_5$ and $R_7$ are each hydrogen, $R_2$, $R_4$, $R_6$ and $R_8$ independently of one another are each hydrogen, methyl, methoxy, chlorine or sulfo, $X_1$ and $X_2$ are each the group —$SO_2$—O— and $Y_1$ is a direct bond, straight-chain or branched $C_1$–$C_4$alkylene or cyclohexylene.

Particularly preferred dyes of the formula (1) are the compounds of the formula

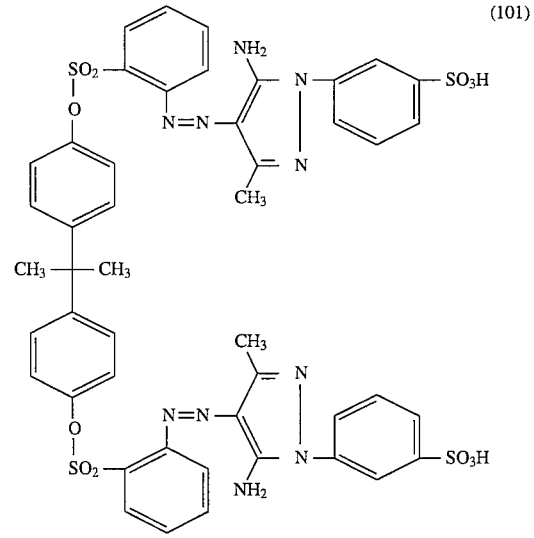

(101)

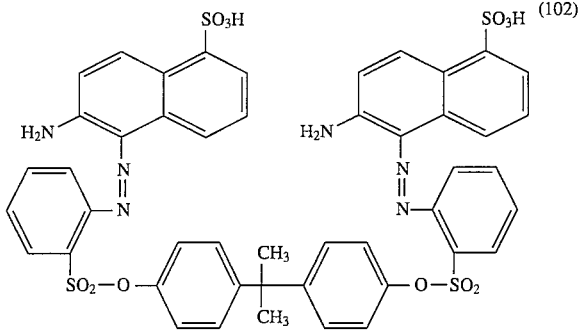

(102)

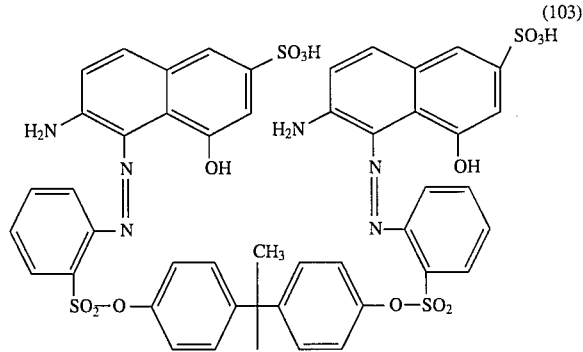
(103)

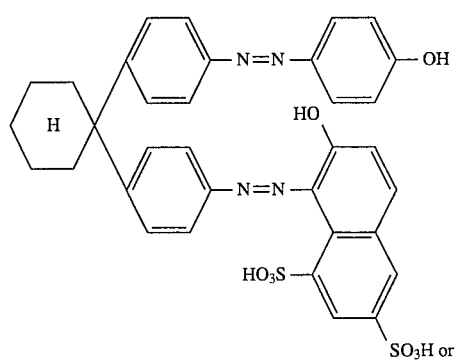
(104)

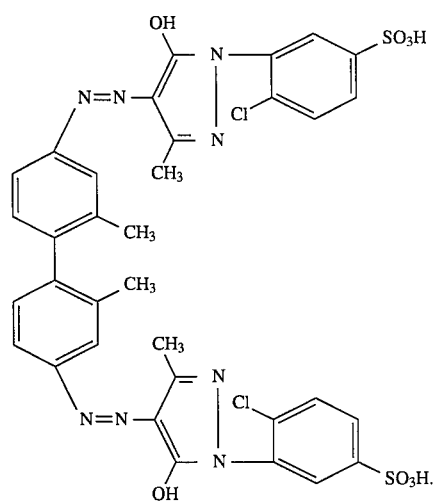
(105)

The compounds of the formula (1) are known per se or can be obtained by methods which are known per se. They can be prepared, for example, by tetraazotizing a compound of the formula

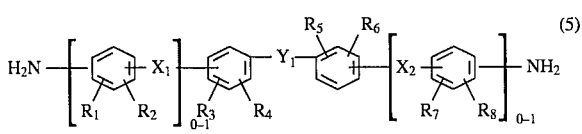
(5)

in a manner known per se, for example with a nitrite in an acidic medium, and then coupling the product in any desired sequence with the coupling components of the formulae

$K_1$—H       (6a) and

$K_2$—H       (6b)

the variables $K_1$, $K_2$, $R_1$–$R_8$, $X_1$, $X_2$ and $Y_1$ each being as defined above.

The compounds of the formula (5) which contain only two phenyl rings, and from which the bracketed components are therefore absent, are known per se. The compounds of the formula (5) which contain four phenyl rings can be obtained, for example, by reacting a compound of the formula

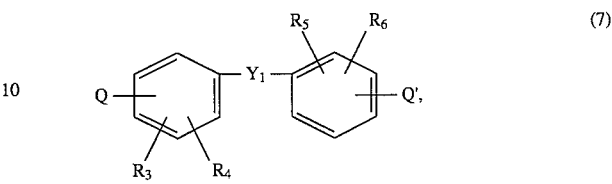
(7)

in which $R_3$–$R_6$ and $Y_1$ are each as defined above and Q is a radical —OH or —NH($R_9$) and Q' is a radical —OH or —NH($R_{10}$) in which $R_9$ and $R_{10}$ are each as defined above, in any desired sequence with the compounds of the formulae

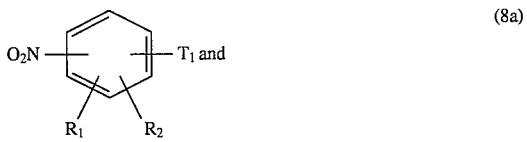
(8a)

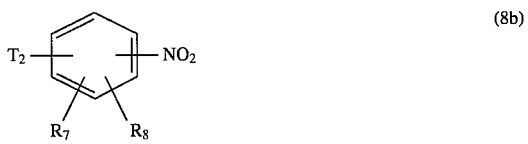
(8b)

in which the variables $R_1$–$R_4$ are each as defined above, $T_1$ and $T_2$ independently of one another are each a group —COHal or —SO$_2$Hal and Hal is halogen, for example chlorine, reducing the resulting dinitro compound of the formula

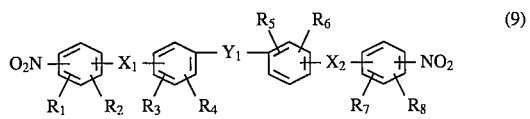
(9)

to the corresponding diamino compound, for example by means of catalytic hydrogenation, and coupling this compound, after its tetraazotization, in any desired sequence with the abovementioned coupling components of the formulae (6a) and (6b).

A preferred group of dyes of the formula (2) used in accordance with the invention are those in which $K_3$ is a phenyl radical which carries one or more substituents from the group consisting of amino, unsubstituted or hydroxyl- or sulfato-substituted N-mono- or N,N-di-$C_1$–$C_2$alkylamino, benzylamino, hydroxyl and methoxy, is a 1- or 2-naphthyl radical which carries one or more substituents from the group consisting of hydroxyl, amino, acetylamino, sulfo and chlorine, or is a 1-phenylpyrazol-5-one or 1-phenyl-5-aminopyrazole radical each of which carries one or more substituents from the group consisting of methyl, methoxy, sulfo and chlorine, $R_{11}$ is hydrogen, $R_{12}$ is hydrogen, methyl, methoxy, chlorine or sulfo, $R_{13}$ and $R_{14}$ independently of one another are each hydrogen, $C_1$–$C_6$alkyl, methoxy, ethoxy, chlorine or sulfo, $R_{15}$ is $C_1$–$C_{10}$alkyl, cyclohexyl or chlorine and $X_3$ is the group —SO$_2$—O—.

A particularly preferred group of dyes of the formula (2) used in accordance with the invention are those in which $K_3$ is a 1- or 2-naphthyl radical which carries one or more substituents from the group consisting of hydroxyl, amino, acetylamino, sulfo and chlorine, or is a 1-phenylpyrazol-5-one or 1-phenyl-5-aminopyrazole radical each of which carries one or more substituents from the group consisting of methyl, methoxy, sulfo and chlorine, $R_{11}$ and $R_{12}$ are each hydrogen, $R_{13}$ is hydrogen or methyl and $R_{14}$ is hydrogen or $C_1$–$C_6$alkyl, $R_{15}$ is $C_1$–$C_{10}$alkyl and $X_3$ is the group —$SO_2$—O—.

The compounds of the formula (2) in which $R_{15}$ is $C_1$–$C_{12}$alkyl or $C_5$–$C_8$cycloalkyl are novel and are a further subject of the invention. The compounds of the formula (2)

$R_{18}$ are each hydrogen, $R_{17}$ and $R_{19}$ independently of one another are each hydrogen, methyl, methoxy, chlorine or sulfo, and $Y_2$ is straight-chain or branched $C_1$–$C_4$alkylene or cyclohexylene.

Particularly preferred dyes of the formula (3) are the compounds of the formula

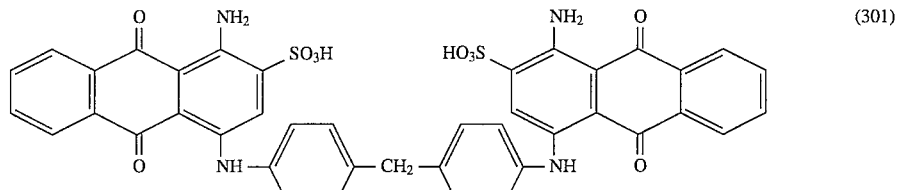
(301)

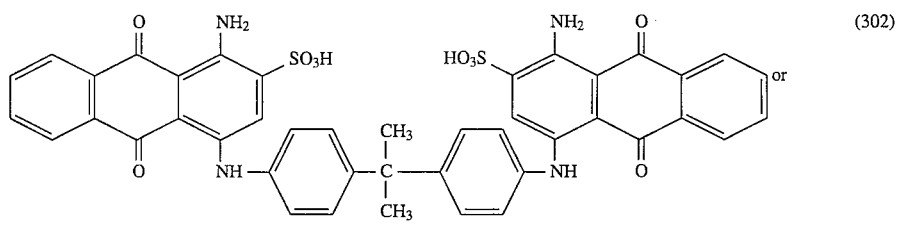
(302)
or

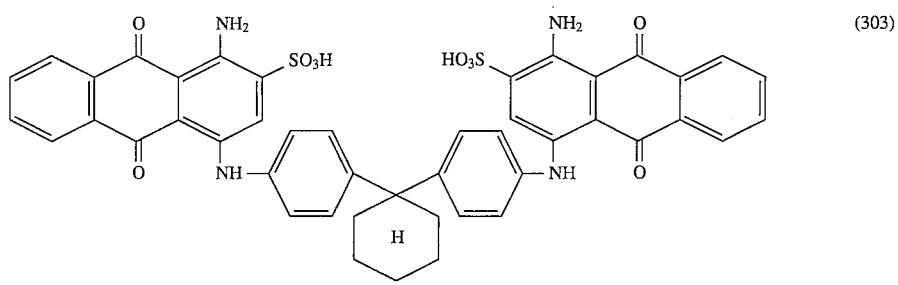
(303)

can be prepared, for example, by diazotizing a compound of the formula

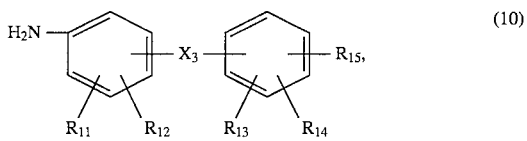
(10)

in which $R_{11}$, $R_{12}$, $R_{13}$, $R_{14}$, $R_{15}$ and $X_3$ are each as defined above, and coupling the product with a coupling component of the formula $K_3$—H  (6c), in which $K_3$ is as defined above. The diazotization of the amines of the formula (5) here can be carried out in a customary manner, for example with nitrites such as sodium nitrite, for example, in an acidic—for example acidified with hydrochloric acid—medium at temperatures of, for example, 0°–15° C. The coupling of the diazotized amines of the formula (10) with the coupling component of the formula (6c) takes place advantageously, for example, in an aqueous or aqueous-organic medium at temperatures of, for example, 0°–30° C. and at a neutral or slightly acidic pH. The compounds of the formula (10) are known per se or can be prepared, for example, analogously to the above-described compounds of the formula (5). The compounds of the formula (6c) are known or can be obtained by methods which are known per se.

A preferred group of dyes of the formula (3) used in accordance with the invention are those in which $R_{16}$ and The compounds of the formula (3) are known per se or can be prepared in a manner known per se, for example by condensing approximately 1 mol-equivalent of a compound of the formula

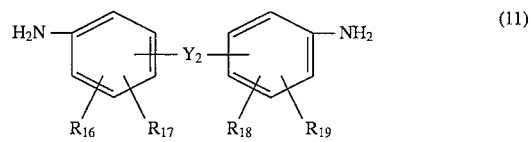
(11)

in which $R_{16}$ to $R_{19}$ and $Y_2$ are each as defined above with approximately 2 mol-equivalents of a compound of the formula

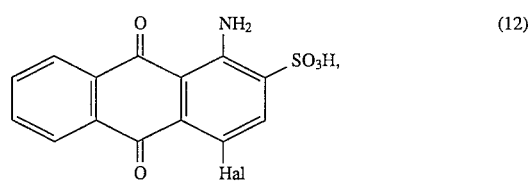
(12)

in which Hal is halogen, for example bromine, in the presence of a catalyst, for example copper powder or a copper salt such as copper chloride, in an organic medium at elevated temperature.

A preferred group of dyes of the formula (4) used in accordance with the invention are those in which $R_{20}$ is hydrogen or $C_1$–$C_6$alkyl and $R_{21}$ is $C_1$–$C_{10}$alkyl, cyclohexyl or benzoylamino.

Particularly preferred dyes of the formula (4) are the compounds of the formula

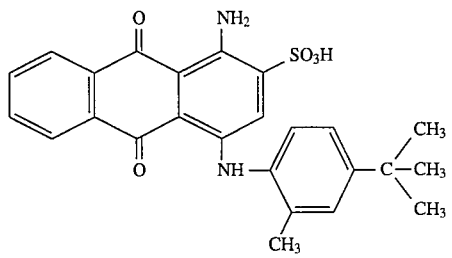 (401)

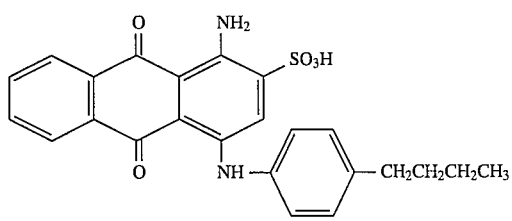 (402)

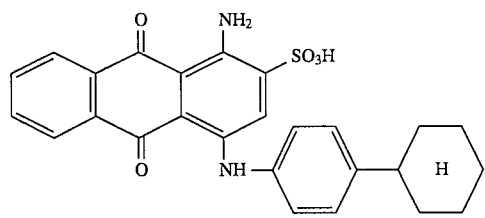 (403)

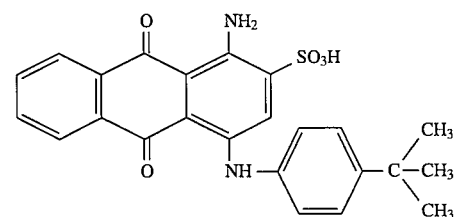 (404)

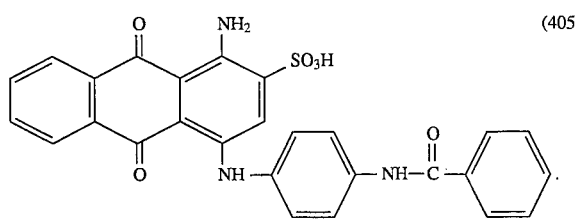 (405)

The compounds of the formula (4) are known or can be obtained in a manner known per se, for example analogously to the compounds of the formula (3).

The dyes of the formulae (1), (2), (3) and (4) used in accordance with the invention each have at least one sulfo group and preferably 1 or 2 sulfo groups each, and are each present either in the form of the free sulfo acid or, preferably, as a salt thereof, for example as a sodium, lithium, potassium, or ammonium salt or the salt with an organic amine, for example a triethanolammonium salt. The dyes of the formulae (1), (2), (3) and (4) and thus the dye mixtures (a) and (b) as well generally comprise further additives, for example sodium chloride or dextrin.

The dyes of the formulae (1) and (2) are present in the dye mixture (a), for example, in a weight ratio of from 1:99 to 99:1, preferably from 25:75 to 75:25 and particularly preferably 50:50.

The dyes of the formulae (3) and (4) are present in the dye mixture (b), for example, in a weight ratio of from 1:99 to 99:1, preferably from 25:75 to 75:25 and particularly preferably 50:50.

The dye mixtures according to the invention can be prepared, for example, by mixing the individual dyes. This mixing process is carried out, for example, in appropriate mills, for example ball mills or pinned-disc mills, and in kneading apparatus or mixers.

Preferred embodiments of the present invention relate to:
 (i) dye mixtures consisting of 100% by weight of a dye mixture (a) comprising one compound each of the above formulae (1) and (2);
 (ii) dye mixtures consisting of 100% by weight of a dye mixture (b) comprising one compound each of the above formulae (3) and (4);
 (iii) dye mixtures consisting of from 25 to 75% by weight of one or more dye mixtures (a) and from 75 to 25% by weight of one or more dye mixtures (b).

The invention additionally relates to a process for dyeing or printing hydroxyl-containing or nitrogen-containing fibre materials with the dye mixtures according to the invention.

Examples of suitable fibre materials are natural cellulose fibres, such as cotton, linen, jute or hemp, and modified cellulose fibres, such as viscose or regenerated cellulose. The dye mixtures according to the invention are particularly suitable for dyeing or printing natural polyamide fibre materials, for example silk or wool, synthetic polyamide fibre materials, for example nylon 6 or nylon 6.6, or blends of wool and synthetic polyamides. The dye mixtures according to the invention are particularly suitable for dyeing or printing natural polyamide fibre materials, especially wool.

This textile fibre material can be in widely varying states of processing, for example as fibres, yarn, loose stock, woven fabric or knitted fabric.

The dye mixtures according to the invention are suitable for the customary dyeing and printing processes and can be applied to and fixed on the fibre material in a wide variety of ways, but in particular in the form of aqueous dye solutions or printing pastes. They are suitable both for the exhaust process and for pad dyeing, in which the goods are impregnated with aqueous dye solutions, which may contain salt, and the dyes are fixed after treatment with alkali or in the presence of alkali, with or without the action of heat. The dye mixtures according to the invention are likewise suitable for the so-called cold pad-batch process, in which the dye together with the alkali is applied to the padder and then fixed by storage for several hours at room temperature.

The dyeing of natural and synthetic polyamide fibre materials, especially wool, is preferably carried out by the exhaust process at a pH of from about 3 to 7, in particular from 3 to 5, and at temperatures of, for example, from 70° to 110° C. and especially from 90° to 100° C.

Apart from water and the dyes, the dyeing liquors or printing pastes can contain further additives, examples being salts, buffer substances, wetting agents, antifoams, levelling assistants or agents which influence the properties of the textile material, for example softeners, flameproofing additives or dirt-, water- and oil-repellents, and also water softeners and natural or synthetic thickeners, for example alginates or cellulose ethers.

The dye mixtures according to the invention give level dyeings and prints with good all-round fastness properties, especially good wet fastness and fastness to washing, rubbing, wet rubbing and light. The dye mixtures according to the invention are additionally distinguished by uniform colour build-up, good fibre affinity and high degrees of fixation. Moreover, it is possible with the dye mixtures according to the invention to dispense with the otherwise customary aftertreatment of the dyeings and prints using so-called fixing agents.

In the examples which follow, parts are by weight. The temperatures are in degrees Celsius. The relationship between parts by weight and parts by volume is the same as that between the gram and the cubic centimeter.

Preparation of the compounds of the formula (2)

EXAMPLE 1

117 parts of 2-nitrobenzene-1-sulfochloride are added over the course of about 45 minutes at 80° C. to a solution of 75 parts of 4-tert-butylphenol, 5 parts of sodium carbonate, 66.3 parts of concentrated sodium hydroxide solution and 200 parts of water. The mixture is subsequently stirred at this temperature for 2 hours more, then cooled to room temperature, the aqueous phase of the resulting emulsion is decanted off, and the residue is dissolved in 600 parts of toluene. The organic phase is washed with water, the phases are separated, and the organic phase is dried over sodium sulfate and concentrated to dryness. The crude product is recrystallized from methanol to give, after drying, 106 parts of the compound of the formula

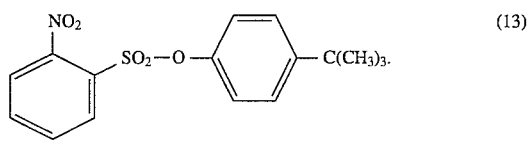
(13)

104 parts of the nitro compound of the formula (13) are catalytically hydrogenated using 5% Pd/C in 600 parts of tetrahydrofuran. Concentration by evaporation gives 92 parts of the amine of the formula

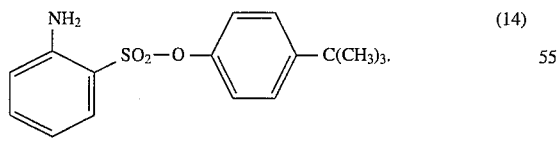
(14)

6.6 parts of nitrosylsulfuric acid are added dropwise at 12° C. to 6.1 parts of the amine of the formula (14) dissolved in 30 parts of sulfolane. The resulting diazo solution is discharged after 1 hour into 120 parts of ice-water, and a solution of 5.3 parts of 1-(3-sulfophenyl)-3-methyl-5-aminopyrazole in 20 parts of water is added dropwise at about 5° C. The pH is adjusted to 2.5 with sodium hydroxide solution, and the reaction mixture is held at about 5° C. for about 1 hour more and then at room temperature for about 2 hours and then adjusted to a pH of 7.5. The dye is salted out with sodium chloride and filtered off to give, after drying, 11.5 parts of the compound of the formula

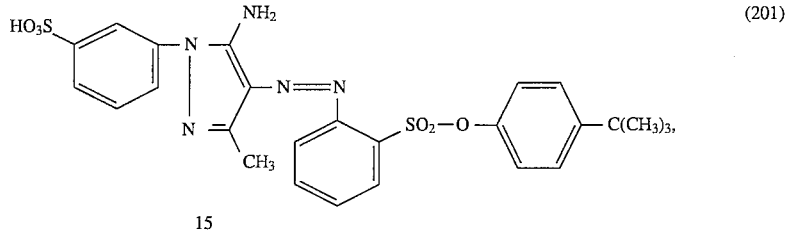
(201)

which dyes wool in a yellow shade with good all-round fastness properties.

EXAMPLE 2–3

The procedure described in Example 1 is repeated using, instead of 5.3 parts of 1-(3-sulfophenyl)-3-methyl-5-aminopyrazole, an equivalent quantity of 2-aminonaphthalene-5-sulfonic acid or 2-amino-8-hydroxynaphthalene-6-sulfonic acid, to give the compounds of the formulae (202) and (203).

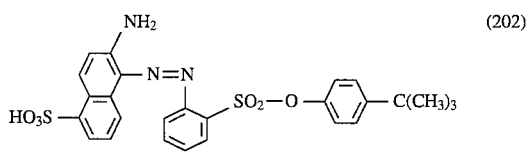
(202)

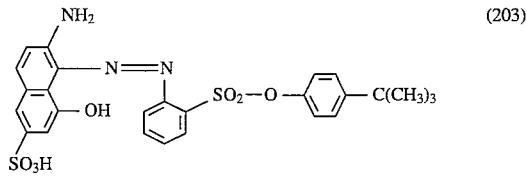
(203)

EXAMPLES 4–25

Following the procedure described in Example 1, it is possible to prepare the following compounds of the general formula

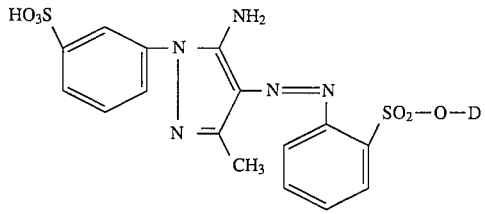

in which D is as defined in the table.

| Example No. | D |
|---|---|
| 4 | 2-methylphenyl |
| 5 | 3-methylphenyl |
| 6 | 4-methylphenyl |
| 7 | 4-tert-octylphenyl |
| 8 | 2,4,6-trimethylphenyl |
| 9 | 2-isopropylphenyl |
| 10 | 2-tert-butylphenyl |

EXAMPLES 26–47

Following the procedure described in Example 1, it is possible to prepare the following compounds of the general formula

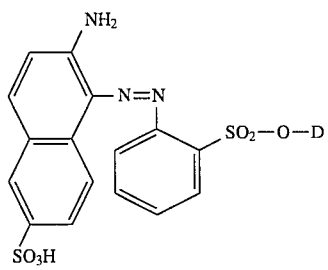

in which D is as defined in the table.

| Example No. | D |
|---|---|
| 11 | 2-chlorophenyl |
| 12 | 2-sec-butylphenyl |
| 13 | 2-tert-amylphenyl |
| 14 | 4-tert-amylphenyl |
| 15 | 2-tert-butyl-4-methylphenyl |
| 16 | 2-tert-butyl-5-methylphenyl |
| 17 | 4-tert-butyl-2-methylphenyl |
| 18 | 6-tert-butyl-2-methylphenyl |
| 19 | 2-tert-butyl-4,5-dimethylphenyl |
| 20 | 2,4-di-tert-butylphenyl |
| 21 | 2,6-di-tert-butylphenyl |
| 22 | 2,6-di-sec-butylphenyl |
| 23 | 2-sec-butyl-4-tert-butylphenyl |
| 24 | 2,4-di-tert-butyl-6-methylphenyl |
| 25 | 2,4-di-tert-amylphenyl |

| Example No. | D |
|---|---|
| 26 | 2-methylphenyl |
| 27 | 3-methylphenyl |
| 28 | 4-methylphenyl |
| 29 | 4-tert-octylphenyl |
| 30 | 2,4,6-trimethylphenyl |
| 31 | 2-isopropylphenyl |
| 32 | 2-tert-butylphenyl |
| 33 | 2-chlorophenyl |
| 34 | 2-sec-butylphenyl |
| 35 | 2-tert-amylphenyl |
| 36 | 4-tert-amylphenyl |
| 37 | 2-tert-butyl-4-methylphenyl |
| 38 | 2-tert-butyl-5-methylphenyl |
| 39 | 4-tert-butyl-2-methylphenyl |
| 40 | 6-tert-butyl-2-methylphenyl |
| 41 | 2-tert-butyl-4,5-dimethylphenyl |
| 42 | 2,4-di-tert-butylphenyl |
| 43 | 2,6-di-tert-butylphenyl |
| 44 | 2,6-di-sec-butylphenyl |
| 45 | 2-sec-butyl-4-tert-butylphenyl |
| 46 | 2,4-di-tert-butyl-6-methylphenyl |
| 47 | 2,4-di-tert-amylphenyl |

EXAMPLES 48–69

Following the procedure described in Example 1, it is possible to prepare the following compounds of the general formula

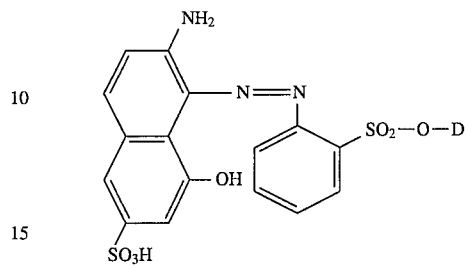

in which D is as defined in the table.

| Example No. | D |
|---|---|
| 48 | 2-methylphenyl |
| 49 | 3-methylphenyl |
| 50 | 4-methylphenyl |
| 51 | 4-tert-octylphenyl |
| 52 | 2,4,6-trimethylphenyl |
| 53 | 2-isopropylphenyl |
| 54 | 2-tert-butylphenyl |
| 55 | 2-chlorophenyl |
| 56 | 2-sec-butylphenyl |
| 57 | 2-tert-amylphenyl |
| 58 | 4-tert-amylphenyl |
| 59 | 2-tert-butyl-4-methylphenyl |
| 60 | 2-tert-butyl-5-methylphenyl |
| 61 | 4-tert-butyl-2-methylphenyl |
| 62 | 6-tert-butyl-2-methylphenyl |
| 63 | 2-tert-butyl-4,5-dimethylphenyl |
| 64 | 2,4-di-tert-butylphenyl |
| 65 | 2,6-di-tert-butylphenyl |
| 66 | 2,6-di-sec-butylphenyl |
| 67 | 2-sec-butyl-4-tert-butylphenyl |
| 68 | 2,4-di-tert-butyl-6-methylphenyl |
| 69 | 2,4-di-tert-amylphenyl |

EXAMPLE 69a 6.6 parts of nitrosylsulfuric acid are added dropwise at 12° C. to 6.1 parts of the amine of the formula (14) as in Example 1 dissolved in 30 parts of sulfolane. The resulting diazo solution is discharged after 1 hour into 120 parts of ice-water, and a solution of 5.1 parts of 1-(3-sulfophenyl)-3-methylpyrazole-5-one in 20 parts of water is added dropwise at about 5° C. The pH is adjusted to 2.5 with sodium hydroxide solution, and the reaction mixture is held at about 5° C. for about 1 hour more and then stirred overnight at room temperature. The dye is salted out at pH 7.5 with sodium chloride and filtered off to give, after drying, 11.5 parts of the compound of the formula

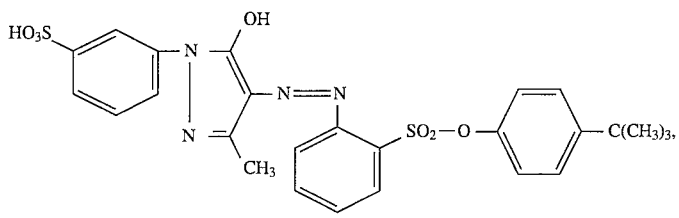
(204)

which dyes wool in a yellow shade with good all-round fastness properties.

EXAMPLES 69b–69d

Following the procedure described in Example 69a, it is possible to prepare the following compounds which each dye wool in a yellow shade with good all-round fastness properties.

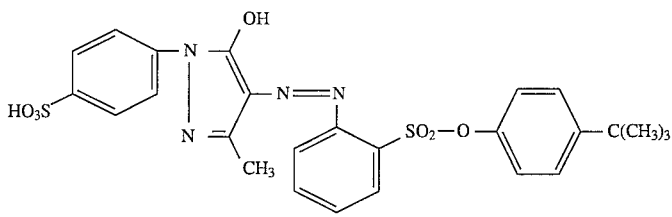
69b

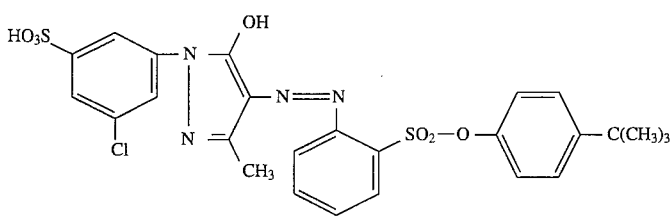
69c

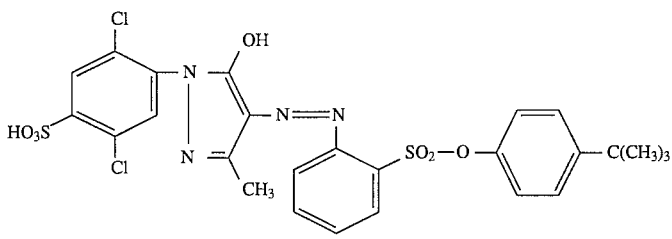
69d

Preparation of the dye mixtures

EXAMPLE 70

25 parts of the dye of the formula (101) indicated in the description and 18 parts of the dye according to Example 1 are homogeneously mixed in a mortar, to give 43 parts of a dye mixture which dyes wool in a yellow shade with good all-round fastness properties.

EXAMPLES 71–79

Following the procedure described in Example 70, it is possible to prepare the following dye mixtures:

| Example No. | Dye mixture | Shade on wool |
|---|---|---|
| 71 | 25 parts of dye of the formula (102)<br>15 parts of dye according to Example 2 | orange |
| 72 | 25 parts of dye of the formula (103)<br>18 parts of dye according to Example 3 | red |
| 73 | 42 parts of dye of the formula (101)<br>30 parts of dye according to Example 7 | yellow |
| 74 | 42 parts of dye of the formula (102)<br>36 parts of dye according to Example 29 | orange |
| 75 | 42 parts of dye of the formula (103)<br>34 parts of dye according to Example 51 | red |
| 76 | 26 parts of dye of the formula (301)<br>60 parts of dye of the formula (401) | blue |
| 77 | 42 parts of dye of the formula (301)<br>26 parts of dye of the formula (401) | blue |
| 78 | 14.75 parts of dye of the formula (102)<br>8.90 parts of dye according to Example 2<br>16.90 parts of dye of the formula (103)<br>12.15 parts of dye according to Example 3<br>14.30 parts of dye of the formula (301)<br>33.00 parts of dye of the formula (401) | brown |
| 79 | 13.21 parts of dye of the formula (102)<br>11.32 parts of dye according to Example 29<br>16.68 parts of dye of the formula (103)<br>13.51 parts of dye according to Example 51<br>27.97 parts of dye of the formula (301)<br>17.31 parts of dye of the formula (401) | brown |

Dyeing Examples

EXAMPLE 80

100 parts of a wool fabric are pretreated at 30° C. and at a pH of 4.5 for 5 minutes in an aqueous bath containing 4000 parts of water, 5 parts of sodium sulfate, 8 parts of sodium acetate and 8 parts of 80% acetic acid. Following the addition of an aqueous solution comprising 1.1 parts of the dye mixture according to Example 70, the dyeing liquor is held at 30° C. for 5 minutes more and then heated to 100° C. at a heating rate of 1° C. per minute. The fabric is dyed at this temperature for 60 minutes, then the temperature is reduced to 50° C. and the dyeing liquor is drained off. The wool fabric, which has been dyed in a yellow shade, is rinsed and dried in a customary manner. The resulting dyeing is level and shows good all-round fastness properties.

EXAMPLES 81–89

Following the procedure of Example 80 but using, instead of the dye mixture according to Example 70, the dye mixtures indicated in the table in quantities referred to therein, highly level dyeings having good all-round fastness properties are likewise obtained.

| Example No. | Dye mixture | Shade on wool |
|---|---|---|
| 81 | 1.1 parts of the dye mixture according to Ex. 71 | orange |
| 82 | 1.3 parts of the dye mixture according to Ex. 72 | red |
| 83 | 2.1 parts of the dye mixture according to Ex. 76 | blue |
| 84 | 1.0 part of the dye mixture according to Ex. 73 | yellow |
| 85 | 1.2 parts of the dye mixture according to Ex. 74 | orange |
| 86 | 1.2 parts of the dye mixture according to Ex. 75 | red |
| 87 | 1.9 parts of the dye mixture according to Ex. 77 | blue |
| 88 | 1.5 parts of the dye mixture according to Ex. 78 | brown |
| 89 | 1.6 parts of the dye mixture according to Ex. 79 | brown |

What is claimed is:

1. A dye mixture consisting of (a) 0–100% by weight of at least one dye mixture consisting essentially of a compound of the formula

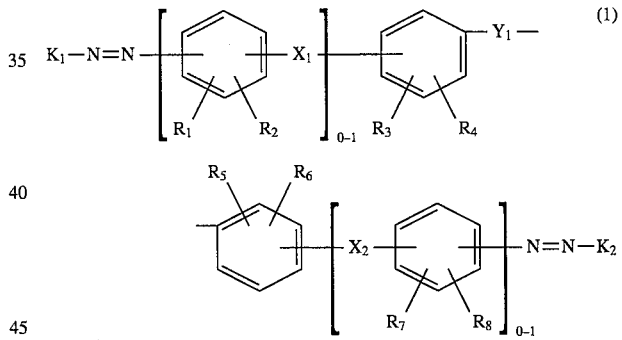

in which $K_1$ and $K_2$ independently of one another are each the radical of a coupling component of the benzene or naphthalene series or of the heterocyclic series, $X_1$ and $X_2$ are each independently of the other a bridging member of the formula $-SO_2-O-$, $-SO_2-N(R_9)-$, $-COO-$ or $-CO-N(R_{10})-$ in which $R_9$ and $R_{10}$ independently of one another are each hydrogen or $C_1-C_4$alkyl, $R_1, R_2, R_3, R_4, R_5, R_6, R_7$ and $R_8$, independently of one another are each hydrogen, $C_1-C_6$alkyl, $C_1-C_4$alkoxy, halogen, sulfo, unsubstituted or halogen-substituted $C_2-C_4$alkanoylamino or an unsubstituted or halogen-substituted group $-NHCO-C_2-C_4$alkylene and $Y_1$ is a direct bond, straight-chain or branched $C_1-C_6$alkylene or $C_5-C_8$cycloalkylene, and a compound of the formula

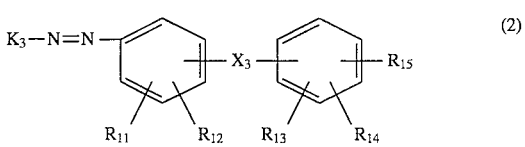

(2)

in which $K_3$ independently is as defined above for $K_1$; $X_3$ independently is as defined above for $X_1$; $R_{11}$, $R_{12}$, $R_{13}$ and $R_{14}$ independently of one another are each as defined above for $R_1$, and $R_{15}$ is $C_1$–$C_{12}$alkyl, $C_5$–$C_8$cycloalkyl or halogen, in which the dye mixture of the dyes of formulae (1) and (2) contain at least one sulfo group, and wherein the dyes of formulae (1) and (2) are present in a weight ratio of 1:99 to 99:1, and (b) 0–100% by weight of at least one dye mixture consisting essentially of a compound of the formula

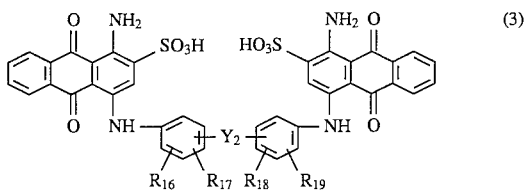

(3)

in which $R_{16}$, $R_{17}$, $R_{18}$ and $R_{19}$ independently of one another are each hydrogen, $C_1$–$C_6$alkyl, $C_1$–$C_4$alkoxy, halogen, unsubstituted or halogen-substituted $C_2$–$C_4$alkanoylamino or an unsubstituted or halogen-substituted group NHCO—$C_2$–$C_4$alkylene and $Y_2$ is a direct bond, straight-chain or branched $C_1$–$C_6$alkylene or $C_5$–$C_8$cycloalkylene, and a compound of the formula

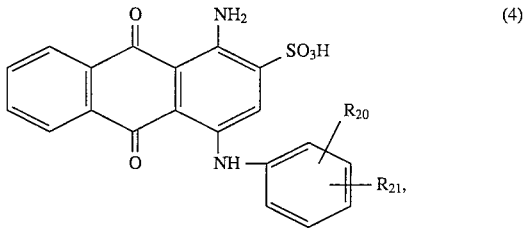

(4)

in which $R_{20}$ is as defined above for $R_{16}$, and $R_{21}$ is $C_1$–$C_{12}$alkyl, $C_5$–$C_8$cycloalkyl, $C_2$–$C_4$alkanoylamino or benzoylamino, and wherein the dyes of formulae (3) and (4) are present in a weight ratio of 1:99 to 99:1; with the proviso that the sum of (a) and (b) is 100% by weight.

2. A dye mixture according to claim 1, wherein $K_1$ and $K_2$ in formula (1) independently of one another are each a phenyl radical which carries one or more substituents selected from the group consisting of amino, unsubstituted or hydroxyl- or sulfato-substituted N-mono- or N,N-di-$C_1$–$C_2$alkylamino, benzylamino, hydroxyl and methoxy, or are a 1- or 2-naphthyl radical which carries one or more substituents selected from the group consisting of hydroxyl, amino, acetylamino, sulfo and chlorine, or are a 1-phenylpyrazol-5-one or 1-phenyl-5-aminopyrazole radical which in each case carries one or more substituents selected from the group consisting of methyl, methoxy, sulfo and chlorine, $R_1$, $R_3$, $R_5$ and $R_7$ are each hydrogen, $R_2$, $R_4$, $R_6$ and $R_8$ independently of one another are each hydrogen, methyl, methoxy, chlorine or sulfo, $X_1$ and $X_2$ are each the group —$SO_2$—O— and $Y_1$ is a direct bond, straight-chain or branched $C_1$–$C_4$alkylene or cyclohexylene.

3. A dye mixture according to claim 1, wherein $K_3$ in formula (2) is a phenyl radical which carries one or more substituents selected from the group consisting of amino, unsubstituted or hydroxyl- or sulfato-substituted N-mono- or N,N-di-$C_1$–$C_2$alkylamino, benzylamino, hydroxyl and methoxy, or is a 1- or 2-naphthyl radical which carries one or more substituents selected from the group consisting of hydroxyl, amino, acetylamino, sulfo and chlorine, or is a 1-phenylpyrazol-5-one or 1-phenyl-5-aminopyrazole radical each of which carries one or more substituents selected from the group consisting of methyl, methoxy, sulfo and chlorine, $R_{11}$ is hydrogen, $R_{12}$ is hydrogen, methyl, methoxy, chlorine or sulfo, $R_{13}$ and $R_{14}$ independently of one another are each hydrogen, $C_1$–$C_6$alkyl, methoxy, ethoxy, chlorine or sulfo, $R_{15}$ is $C_1$–$C_{10}$alkyl, cyclohexyl or chlorine and X3 is the group —$SO_2$—O—.

4. A dye mixture according to claim 1, wherein $K_3$ in formula (2) is a 1- or 2-naphthyl radical which carries one or more substituents selected from the group consisting of hydroxyl, amino, acetylamino, sulfo and chlorine, or is a 1-phenylpyrazol-5one or 1-phenyl-5-aminopyrazole radical each of which carries one or more substituents from the group consisting of methyl, methoxy, sulfo and chlorine, $R_{11}$ and $R_{12}$ are each hydrogen, $R_{13}$ is hydrogen or methyl and $R_{14}$ is hydrogen or $C_1$–$C_6$alkyl, $R_{15}$ is $C_1$–$C_{10}$alkyl and $X_3$ is the group —$SO_2$—O—.

5. A dye mixture according to claim 1, wherein $R_{16}$ and $R_{18}$ in formula (3) are each hydrogen, $R_{17}$ and $R_{19}$ independently of one another are each hydrogen, methyl, methoxy, chlorine or sulfo and $Y_2$ is straight-chain or branched $C_1$–$C_4$alkylene or cyclohexylene.

6. A dye mixture according to claim 1, wherein $R_{20}$ in formula (4) is hydrogen or $C_1$–$C_6$alkyl and $R_{21}$ is $C_1$–$C_{10}$alkyl, cyclohexyl or benzoylamino.

7. A dye mixture according to claim 1, wherein the compounds of the formulae (1), (2), (3) and (4) each have 1 or 2 sulfo groups.

8. A dye mixture according to claim 1, which consists of a dye mixture (a) containing one compound each of the formulae (1) and (2) in a weight ratio of from 25:75 to 75:25.

9. A dye mixture according to claim 1, which consists of a dye mixture (b) containing one compound each of the formulae (3) and (4) in a weight ratio of from 25:75 to 75:25.

10. A dye mixture according to claim 1, which consists of from 25 to 75% by weight of one or more dye mixtures (a) and from 75 to 25% by weight of one or more dye mixtures (b).

11. A process for dyeing or printing a hydroxyl-containing or nitrogen-containing fibre material, which comprises bringing said fibre material in an aqueous solution into contact with a dye mixture according to claim 1.

12. A process according to claim 11 for the dyeing or printing of a wool-containing fibre material.

* * * * *